United States Patent [19]

Mangless

[11] 4,116,484
[45] Sep. 26, 1978

[54] TILTABLE CAB MOUNTING

[75] Inventor: Vernon W. Mangless, Mukwonago, Wis.

[73] Assignee: Allis-Chalmers Corporation, Milwaukee, Wis.

[21] Appl. No.: 751,760

[22] Filed: Dec. 17, 1976

[51] Int. Cl.² ............................................. B62D 33/06
[52] U.S. Cl. ................................. 296/28 C; 180/89.14
[58] Field of Search ...................... 296/28 C; 254/126; 180/89.12, 89.13, 89.14, 89.15, 89.16, 89.17, 89.18, 89.19

[56] References Cited

U.S. PATENT DOCUMENTS

| | | | |
|---|---|---|---|
| 2,769,503 | 11/1956 | Wagner | 180/89.17 |
| 3,055,699 | 9/1962 | May | 296/28 C |
| 3,263,430 | 8/1966 | Bryan | 254/126 |
| 3,582,132 | 6/1971 | Gunning | 296/28 C |
| 3,583,518 | 6/1971 | Bichel | 180/89.17 |
| 3,737,192 | 6/1973 | Hirsch | 296/28 C |
| 3,752,530 | 8/1973 | Voth | 180/89.12 |
| 3,918,541 | 11/1975 | Krieger | 180/89.12 |
| 3,940,177 | 2/1976 | Miers | 296/28 C |
| 3,985,385 | 10/1976 | Kennicutt | 296/28 C |
| 4,013,136 | 3/1977 | Fear | 180/89.12 |

*Primary Examiner*—Joseph F. Peters, Jr.
*Assistant Examiner*—John A. Carroll
*Attorney, Agent, or Firm*—Arthur L. Nelson

[57] ABSTRACT

A tiltable cab for a tractor pivotally mounted on the chassis and tiltable when the floor boards are removed and all but a pair of bolts on the rearward side portion of the cab are removed to provide a pivoting axis for the cab with clearance inside the cab to allow the cab to pivot beyond the control console to a rearwardly tilted position.

10 Claims, 6 Drawing Figures

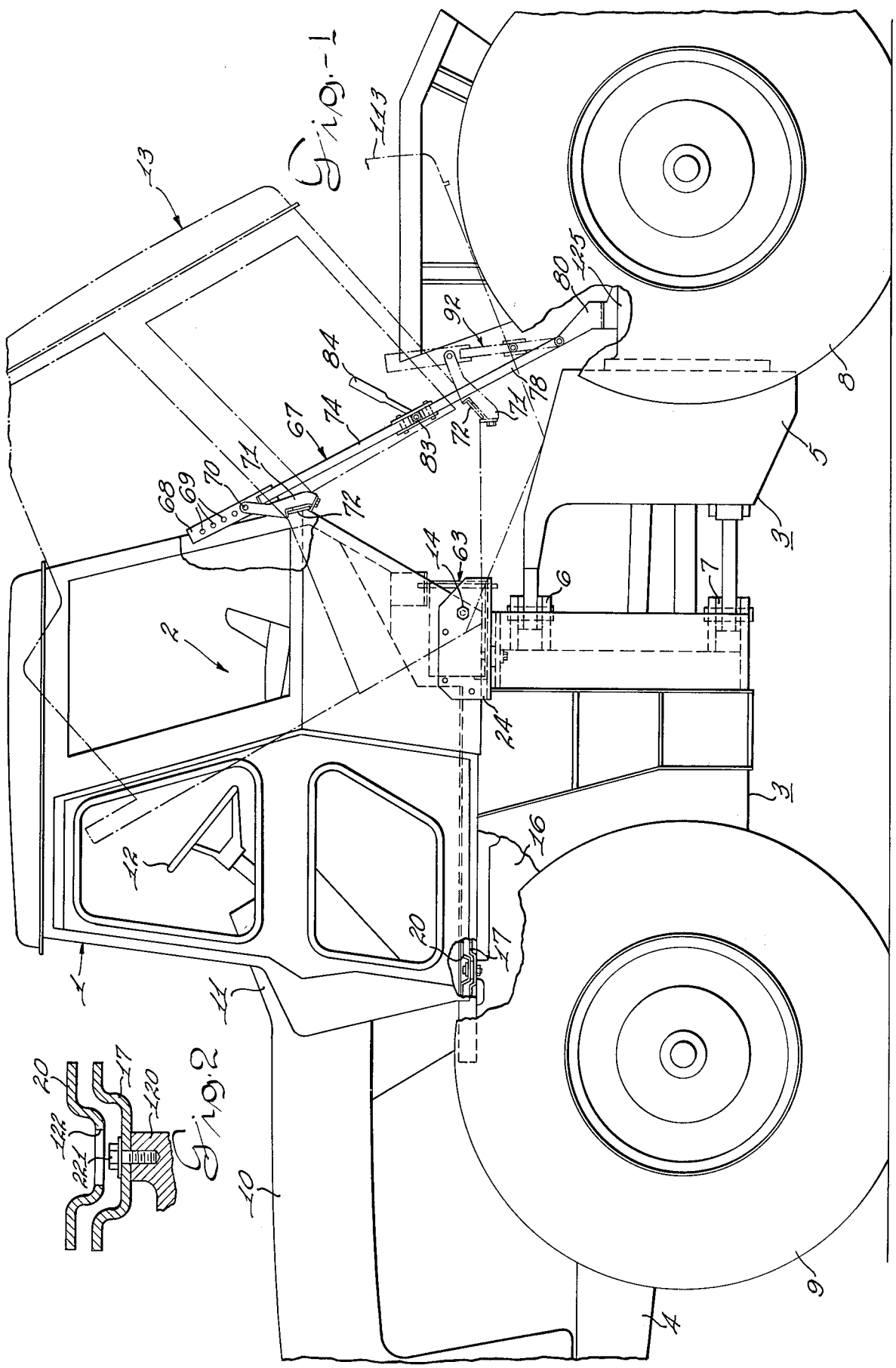

TILTABLE CAB MOUNTING

This invention relates to a tiltable cab and more particularly to a pivotal supporting structure and locking means on the rearward portion of the cab and a removable platform allowing the cab to tilt rearwardly and provide for clearance between the cab and the control console and the steering wheel as the cab is tilted to a rearward tilted position.

The size of tractors built today are generally larger than their predecessors. This is particularly true in the four-wheel drive series of tractors where the tractors are so tall that shop owners are not only concerned with inadequate hoists and other facilities for removing the cab from the tractor, but the lack of ceiling clearances. Accordingly, a tiltable cab which can be tilted on the vehicle but remain on the vehicle in a tilted position while allowing the control console and all operating levers to remain in a functional position can in many instances obviate the need for a hoist. The pivotal arrangement should be such that it can be accomplished with men available in the area at the time. Accordingly, this invention provides for a cab in which the platform can be removed which will provide the clearance for the base of the cab to pivot by the control console and steering wheel and open the area immediately around the transmission housing to facilitate servicing. This invention provides for unlocking of the rearward portion of the cab and the provision of two bolts defining a pivotal axis to tilt the cab rearwardly on the vehicle mountings. Also provided with the tractor is a cab tilting mechanism which can be mounted on the vehicle chassis with a connecting arm engaging the rearward portion of the cab and through a mechanical advantage can be operated to tilt the cab rearwardly so that the center of gravity of the cab is rearwardly of the pivoting axis on the cab. In this manner, the cab can be tilted out of the way for servicing of the tractor at the area normally covered by the cab.

It is an object of this invention to provide a tiltable cab on a tractor.

It is another object of this invention to provide a tiltable cab on a tractor for tilting rearwardly on rearward pivotal supports.

It is a further object of this invention to provide clearance between a tiltable cab and the control console and steering wheel when the platform is removed and a locking and fastening means on the rearward portion of the cab that can be removed to allow the cab to pivot rearwardly on a pair of bolts axially aligned to form the pivoting axis for tilting the cab.

It is a further object of this invention to provide a tiltable cab which can be tilted rearwardly on the tractor by means of a mechanical tilting mechanism which can be connected to the cab and the vehicle chassis to pull the cab rearwardly and tilt the cab out of the way for convenient servicing of the tractor.

The objects of this invention are accomplished on a four-wheel drive tractor with a cab which is supported on a cab supporting frame. The cab supporting frame is resiliently mounted on the vehicle chassis through rubber isolators. The platform of the cab is bolted to the cab supporting frame to fasten the cab on the forward portion of the frame. The rearward portion of the cab is bolted by a plurality of bolts fastening the rearward side portion of the cab to vertical brackets. All but a pair of bolts can be removed to allow the cab to pivot rearwardly when the platform is removed whereby the clearance of the base of the cab permits the base to pivot by the control console and steering wheel to a rearwardly tilted position. Although the cab can be pivoted to this rearward position by two men, a mechanical tilting mechanism is also provided in which a clamp engages the rearward side of the cab and the base of the mechanism is fastened to the chassis and through a means providing a mechanical advantage, the cab can be tilted rearwardly by one man and retained in this rearwardly tilted position by the cab tilting mechanism.

The preferred embodiment of this invention is illustrated in the attached drawings in which:

FIG. 1 is a side elevation view of the tractor showing the cab in the operating position and a phantom view showing the cab in the rearwardly tilted position;

FIG. 2 is a cross-section view taken on line II—II of FIG. 5;

Figure 3:
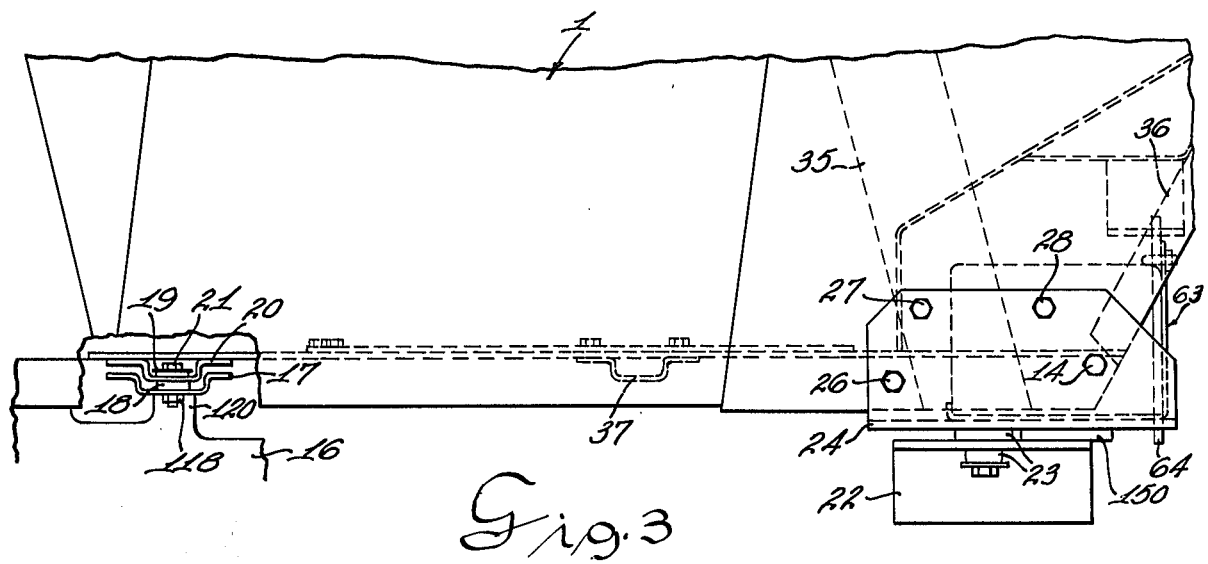
FIG. 3 is a partial section view of the side of the cab showing the mounting of the cab on the tractor.

FIG. 1 illustrates a side elevation view of the tractor. The cab 1 defines the operator station 2 within the cab. The tractor includes a front vehicle chassis 3 formed by the front bogie 4 and the rear chassis 125 of rear bogie 5. The front and rear bogies are connected by articulated bearings 6 and 7. The rear bogie includes the rear wheels 8 which drive the rear bogie of the tractor. The front bogie includes the front wheels 9 with an engine hood 10 connected to the front of the console 11 which carries the steering wheel 12. The cab 1 is shown in the operating position and the tilted position 13 is shown in the phantom lines. The bolt 14 defines the pivotal axis on the left-hand side of the tractor which is coincidental with a mating bolt 34 on the opposite side of the tractor which pivotally supports the cab in the tilted position. The transmission housing 16 forms embossments 120 and 121. Embossments 120 is shown in FIG. 3. The embossments 120 and 121 of the chassis 4 support the cross-beam 17. The isolators 18 and 145 mounted on cross-beam 17 resiliently support cross-member 20. The bolt 21 extends through washer 19 and the rubber isolator 18 and fastens to nut 118 and bolt 45 is mounted in a similar manner on isolator 45. Openings 122 and 123 in cross-member 20 are provided for removal at bolts 221 and 245, if necessary.

The rearward portion of the cab is supported on a supports 22 and 30 which are integral with the vehicle chassis 4. The rubber isolator 23 resiliently suspends the bracket 24 on the support 22. The bracket 24 extends upwardly and receive the bolts 26, 27, 28 and 14 to support the cab 1. Similarly, the support 30 resiliently supports the bracket 31 through the rubber isolator 32. A plurality of bolts of which two are shown 33 and 34 support the cab on the opposite side.

The channel 35 and brace 36 provide reinforcement on the cab on the rearward portion as shown in FIG. 2. A cross-member 37 is bolted to the under side of the side members 38 and 39 to provide support. The side members 38 and 39 form the base of the platform structure for the cab and are fabricated to the side of the cab to form the wall structure on the side of the cab.

The platform structure consists of the floor panel 40 is bolted to the side beam 38 by bolt 44 and to side beam 39 by bolt 43. These bolts also extend through to fasten to the cross-member 37. The cross-member 37 and cross-member 20 are welded to channel 106 to form the platform and supporting structure and cab supporting frame 107. The floor panel is also bolted to the cross-member 37 by the bolts 43 and 44. The floor panel 40 is bolted to the channel 106 by bolts 102, 103, 104 and 105.

Bolts 21 and 45 each carry an isolator which resiliently supports the cross-member 20 and cross-beam 17. The cross-member 20 is bolted to the side members 39 and 38 by bolts 46 and 47. The floor panel 40 can be removed by removing the bolts 43, 44, 100, 101, 102, 103, 104 and 105. This provides a clearance between the side beams 38 and 39 and the control console 11 and steering wheel 12 when the cab is tilted rearwardly.

The right-hand side of the cab 1 is also reinforced with the channel 48 and brace 49 similar to the channel 35 and brace 36 on the left-hand side of the cab. The forward end of the side beam 39 is provided with a tab 50 which is bolted to the side beam 39 by the bolt 51. A bolt 52 is provided to fasten the side beam 39 to the control console 11. Similarly, the tab 53 is bolted to the side beam 38 by the bolt 54. A bolt 55 bolts side beam 38 to the control console while the cab is in the operating position.

Figure 4:
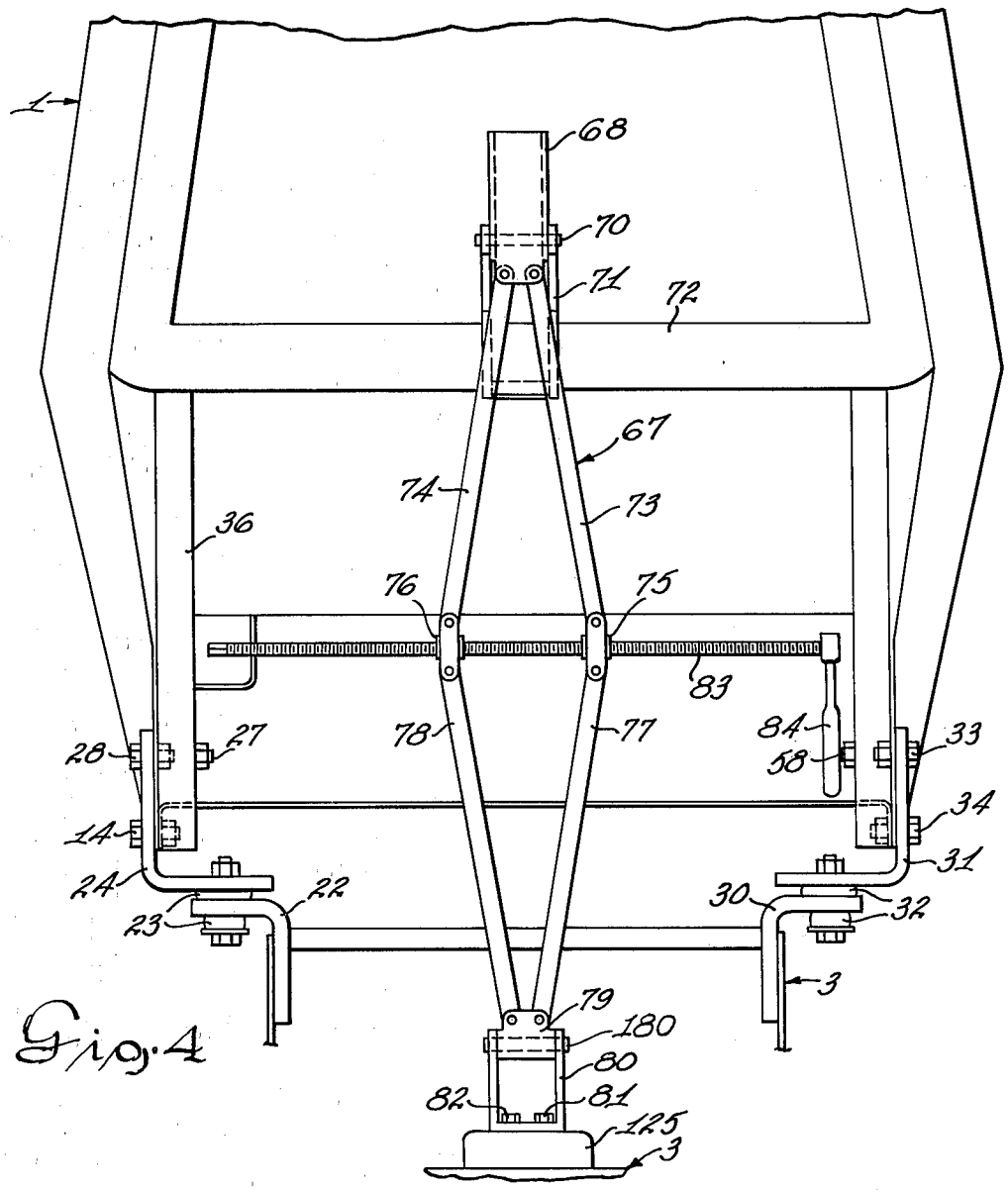
FIG. 4 is a partially sectioned rear view of the cab showing the cab tilting mechanism for tilting the cab rearwardly.
Figure 5:
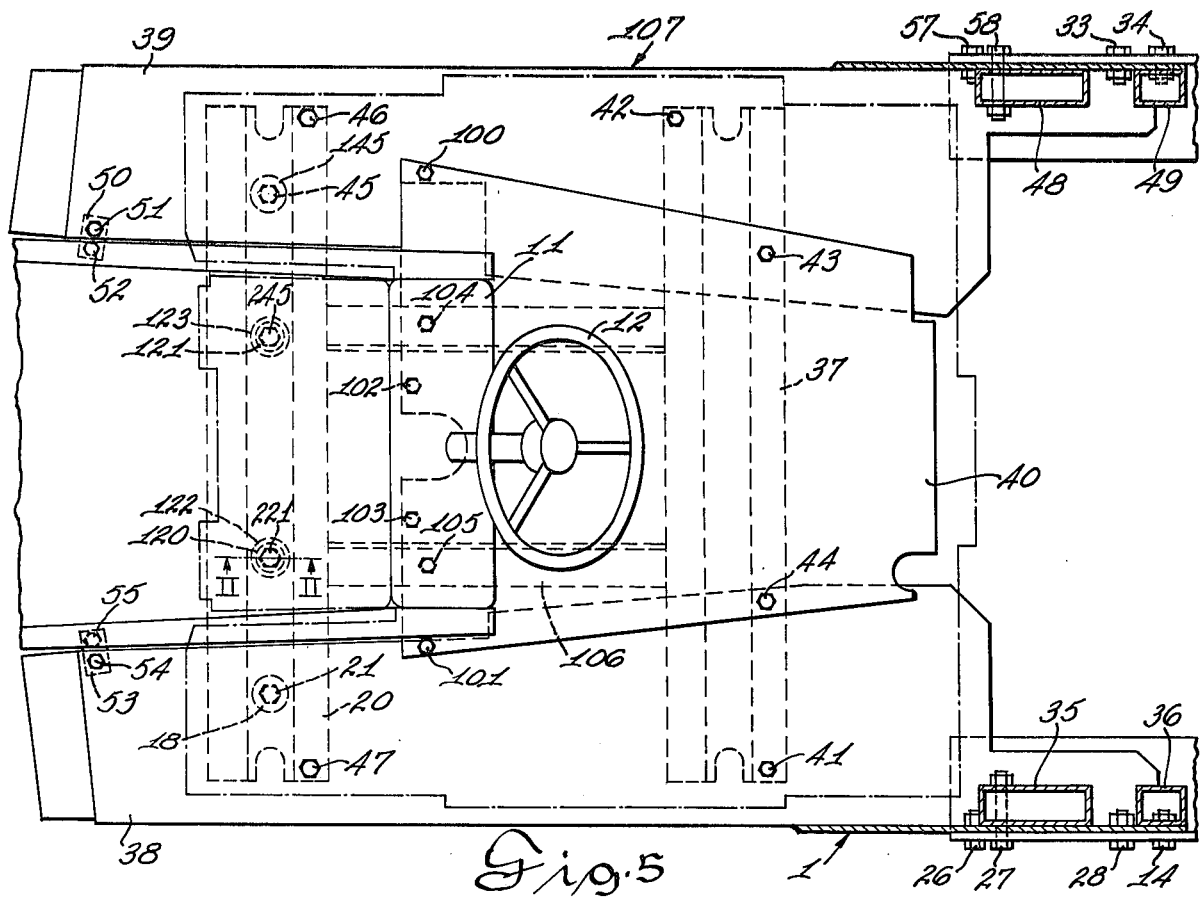
FIG. 5 is a section view showing the platform in the cab.
Figure 6:
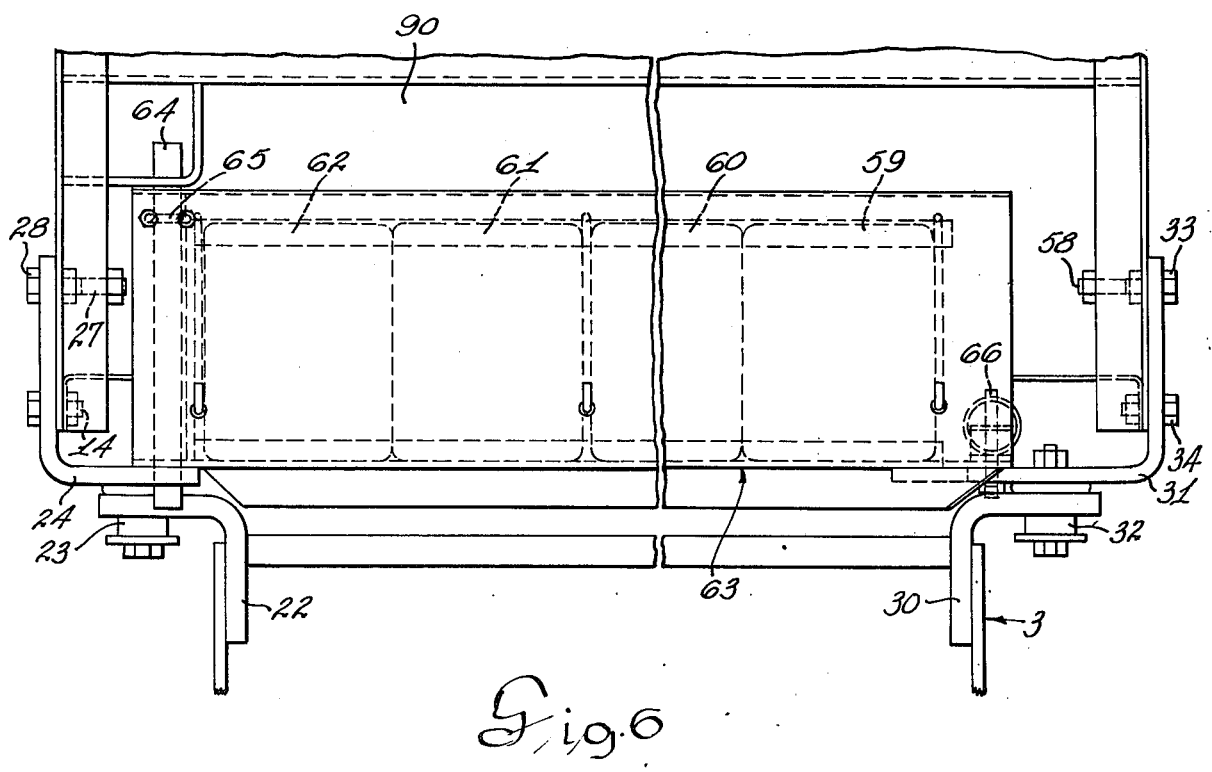
FIG. 6 is a a partial section rear view of the vehicle cab with the battery mounted therein and the supporting structure for the rearward portion of the cab.

FIGS. 4 and 5 show the rear of the vehicle cab illustrating the mounting of the cab. Bolts 57 and 58 and 34 and 33 are shown connecting the bracket 31 to the cab. The batteries 59, 60, 61, 62 are mounted in the battery tray 63. The battery tray 63 is mounted on the post 64. The tray is clamped to the post 64 by the U-bolt 65 which can be removed to allow the removal of the post 65 and then removal of the battery tray 63 when the latch pin 66 is released. In this manner, the battery can be removed so the cab can be tilted rearwardly to the position shown in the phantom view 13 of FIG. 1.

FIG. 4 shows the rear view of the cab with the cab tilting mechanism 67. The upper end of the cab tilting mechanism 67 includes channel 68 forming a plurality of openings 69 for pivotally positioning the pin 70 which is pivotally connected to the clamp 71. The clamp 71 is mounted on a cross-bar 72 of the rear end of the cab 1 for fastening the cab tilting mechanism 67 during the tilting operation.

The cab tilting mechanism also includes the two upper links 73 and 74 which are pivotally connected to the channel 68 on their upper ends and pivotally connected to the threaded sleeves 75 and 76 on their lower ends. Sleeves 75 and 76 are also pivotally connected to the lower links 77 and 78 of the cab tilting mechanism 67. The lower ends of the cab tilting mechanism 77, 78 are pivotally connected to the bushing 79 which in turn is rotatably connected to the pin 180. Pin 180 is pivotally supported in the base 80 which is fastened by bolts 81 and 82 to the rear chassis 105 of the rear bogie 3. The jackscrew 83 is rotated by means of a handle 84 to expand or contract the linkage transversely which in turn shortens or lengthens the cab tilting mechanism 67.

This device will be described in the following paragraphs.

When it is desired to tilt the cab, the platform bolts 43, 100, 101, 102, 103, 104 and 105 are removed. This loosens the platform panel 40 and permits removal of the platform from the cab. Similarly, the bolts 50 and 55 are removed permitting the side beams 39 and 38 to move upwardly from the chassis.

The batteries 59, 60, 61 and 62 are removed from the battery tray 43. The U-bolts 65 is then removed from the post 64 which carries the battery tray 63. When the latch pin 66 is removed, the battery tray and the batteries are free to be removed from the battery compartment 90.

With the batteries removed and the platform from the interior of the cab removed, and the bolts 26, 27 and 28 as well as bolts 57, 58 and 33 removed from brackets 22 and 33, respectively, the cab is then ready to be tilted rearwardly. The cab tilting mechanism 67 is clamped to the cross-bar 72 on the back of the cab as shown in FIG. 3. The base 80 is then bolted to the chassis 105 of the rear bogie 3. With the cab tilting mechanism as shown in FIG. 3, the handle 84 rotates the jackscrew 83 expanding the links 73, 74, 77 and 78 transversely to shorten the linkage and tilt the cab rearwardly to the position 13 as shown in FIG. 1. When the cab is tilted to this position, the center of gravity acts downwardly to the rear of the pivotal axis defined by the bolts 14 and a mating bolt 34 on the opposite side of the cab. When the cab tilting mechanism 67 has completely tilted the cab, it will be in the phantom view 13 as shown in FIG. 1. In this position, the cab is held in the tilted position to avoid any danger of it falling forwardly in the working area when the vehicle is being serviced. Preferably a spacer 150 should be inserted between bracket 22 and brace 24 and also bracket 30 and braces 31.

When it is desired to move the cab into the operating position as shown in FIG. 1, the cab tilting mechanism 67 is operated so that the jackscrew 83 contracts the sleeves 75 and 76 to the centered position as shown in FIG. 1. In this position, the cab is again placed back in the operating position. The platform panel 40 is remounted in the cab and the cab is then again in the operating position. Likewise, the batteries 59, 60, 61 and 62 are mounted on the battery tray 63 and the battery tray is mounted on the pivot post 64 as shown in FIG. 5 by means of the U-bolt 65. The latch pin 66 is inserted in the latch and the batteries are again in the operating position.

Removal of the platform panel 40 from the side members 39 and 38 provides clearance so that the cab can tilt backwardly while the side members move alongside the control console 11 so that it is not necessary to remove the steering wheel or the control console. The vehicle could be operated with the cab in this position if necessary. The cab could be tilted rearwardly into the tilted position and then the tractor move underneath the roof of the repair shop if desired.

It is, however, understood that the cab is light enough so that when the platform is removed and the batteries and the battery tray are removed from the cab, the tractor cab can be tilted manually by two persons to overcome the force of gravity acting forwardly at the pivotal axis. When the cab is tilted to the tilted position 113 shown in the phantom view of FIG. 1, the center of gravity causes a force acting downwardly to the rear of the pivotal axis to hold the cab in the tilted position. It is not necessary to use the cab tilting mechanism 67 to tilt the cab rearwardly or to retilt it forwardly in the operating position.

The embodiments of the invention in which an exclusive property or privilege is claimed are defined as follows:

1. A tractor having a cab mounted thereon comprising, a tractor chassis, a cab supporting frame means resiliently mounted on said chassis, a cab defining an operator station including side members extending along the side of the cab and supported on said cab supporting frame means, a platform supported on said side members, fastening means removably fastening said platform and the side members of said cab to said cab supporting frame means, a control console mounted on said cab supporting frame means extending upwardly between said side members into said cab, pivotal support means resiliently mounted on said chassis and pivotally supporting the lower rear portion of said cab for pivotal movement above a horizontal axis, removable locking means for selectively and alternatively locking said cab in the operating position and releasing said cab for pivoting to a tilted position.

2. A tractor having a cab mounted thereon as set forth in claim 1 wherein said side members on each side of the base of said cab define plates removably mounted on said cab supporting frame, means providing clearance between said side members and said control console when said platform is removed and said cab is pivoted to the tilted position.

3. A tractor having a cab mounted thereon as set forth in claim 1 including mechanical means connected between said chassis and said cab for tilting said cab to the tilted position.

4. A tractor having a cab mounted thereon and set forth in claim 1 including a plurality of rubber isolators mounted between said chassis and said cab supporting frame means and said pivotal support means to isolate said cab from said chassis.

5. A tractor having a cab mounted thereon as set forth in claim 1 wherein said locking means and said pivotal support means includes supporting brackets resiliently mounted on said vehicle chassis, a plurality of bolts fastening each of said brackets to the rear lower end of said cab, said pivotal support means including a pair of bolts on a common axis on opposing sides of said cab for pivotally supporting said cab in its tilted position.

6. A tractor having a cab mounted thereon as set forth in claim 1 wherein said pivotal support means includes a bolt on either side of said cab each pivotally mounted on a mating bracket, means resiliently supporting said brackets on said chassis to thereby pivotally support said vehicle cab.

7. A tractor having a cab mounted thereon as set forth in claim 1 including a plurality of rubber isolators resiliently supporting said cab supporting frame means and said pivotal support means on said vehicle chassis, an auxiliary support removably positioned between said cab mounting frame means and said chassis for supporting said cab and relieving the strain on said isolators when said cab is pivoted to the tilted position.

8. A tractor having a cab mounted thereon as set forth in claim 1 wherein said pivoting support means includes auxiliary support means fastened to the rear end of said cab for rigidly supporting said cab when said cab is in the tilted position.

9. A tractor having a cab mounted thereon as set forth in claim 1 wherein said locking means and said pivotal support means define four bolts fastening said cab on a bracket resiliently supported on said vehicle chassis, a pair of said bolts having coincidental axes defining pivotal support means when the remaining bolts are removed for unlocking said cab.

10. A tractor having a cab mounted thereon as set forth in claim 1 wherein said pivotal support means defines a pivotal axis, means defining a center of gravity of said cab acting forwardly of said pivotal axis when said cab is in the operating position and rearwardly of said pivotal axis when said cab is in the tilted position.

* * * * *